(12) United States Patent
Bonnet et al.

(10) Patent No.: US 10,512,821 B2
(45) Date of Patent: Dec. 24, 2019

(54) BELAYING LANYARD EQUIPPED WITH IMPROVED SWIVEL CONNECTION

(71) Applicant: ZEDEL, Crolles (FR)

(72) Inventors: Guillaume Bonnet, Montbonnot (FR); Jean-Marc Hede, Domène (FR)

(73) Assignee: ZEDEL, Crolles (FR)

( * ) Notice: Subject to any disclaimer, the term of this patent is extended or adjusted under 35 U.S.C. 154(b) by 0 days.

(21) Appl. No.: 15/438,173

(22) Filed: Feb. 21, 2017

(65) Prior Publication Data

US 2017/0246508 A1    Aug. 31, 2017

(30) Foreign Application Priority Data

Feb. 29, 2016   (FR) ...................................... 16 51671

(51) Int. Cl.
| | |
|---|---|
| *F16G 15/08* | (2006.01) |
| *A63B 29/02* | (2006.01) |
| *A62B 35/00* | (2006.01) |
| *F16C 11/04* | (2006.01) |

(52) U.S. Cl.
CPC .......... *A63B 29/02* (2013.01); *A62B 35/0075* (2013.01); *F16C 11/04* (2013.01); *F16G 15/08* (2013.01)

(58) Field of Classification Search
CPC ..... A63B 29/02; F16G 15/08; A62B 35/0075; F16C 11/04
See application file for complete search history.

(56) References Cited

U.S. PATENT DOCUMENTS

| | | | | |
|---|---|---|---|---|
| 449,324 | A * | 3/1891 | Kelley | F16G 15/08 59/95 |
| 637,122 | A * | 11/1899 | Isachson | F16G 15/08 59/95 |
| 1,048,475 | A * | 12/1912 | Graham | F16G 15/08 59/95 |
| 1,533,555 | A * | 4/1925 | Howard | B66C 1/34 403/213 |
| 1,537,785 | A * | 5/1925 | Parker | F16G 15/08 24/129 R |
| 2,297,277 | A * | 9/1942 | Bambenek | F16G 15/08 24/299 |
| 2,311,043 | A * | 2/1943 | Furey | E21C 29/08 16/205 |
| 2,375,719 | A * | 5/1945 | Wirkkala | B66C 1/34 294/82.11 |
| 2,387,599 | A * | 10/1945 | Miller | B64F 1/08 403/165 |

(Continued)

FOREIGN PATENT DOCUMENTS

EP            2878855 A1     6/2015

*Primary Examiner* — Jason W San
(74) *Attorney, Agent, or Firm* — Oliff PLC (57) ABSTRACT

Lanyard having at least one belaying strap connected with a swivel connection which comprises two assembly parts able to rotate with respect to one another with a relative rotational movement. The two assembly parts of tubular shape are engaged coaxially in one another, the first outer part having a larger diameter than that of the second inner part. At least one of the parts is provided with a slot or hole for fitting securing means designed to secure the two parts in rotation in the engaged state.

Applications: safety and securing lanyards for via ferrata, caving, mountaineering.

4 Claims, 8 Drawing Sheets

(56) References Cited

U.S. PATENT DOCUMENTS

| | | | | |
|---|---|---|---|---|
| 2,438,548 A * | 3/1948 | Ehmann | F16G 15/08 403/169 |
| 3,318,575 A * | 5/1967 | Hawkins | B66C 1/34 267/141 |
| 3,504,937 A * | 4/1970 | Panovic | F16G 15/08 403/164 |
| 4,141,116 A * | 2/1979 | Zalonis | A01K 91/03 24/375 |
| 4,239,271 A * | 12/1980 | Beasley | B66C 1/18 294/74 |
| 4,274,252 A * | 6/1981 | Cavender | F16G 15/08 59/86 |
| 4,431,352 A * | 2/1984 | Andrews | B66C 1/66 248/499 |
| 4,482,264 A * | 11/1984 | Kodera | A01K 91/03 403/165 |
| 5,136,759 A * | 8/1992 | Armour, II | A44B 18/00 24/16 R |
| 5,230,451 A * | 7/1993 | Onozawa | A45F 3/14 2/300 |
| 5,381,650 A * | 1/1995 | Garrett | F16G 15/08 403/78 |
| 5,727,833 A * | 3/1998 | Coe | B66C 1/12 294/74 |
| 5,823,588 A * | 10/1998 | Morghen | B66C 1/66 294/89 |
| 6,349,985 B1 * | 2/2002 | Aston | B66C 1/66 294/215 |
| 6,612,001 B1 * | 9/2003 | Yngvesson | F16G 15/04 24/116 R |
| 8,061,750 B1 * | 11/2011 | Hamilton | A45C 13/30 294/149 |
| 8,201,867 B2 * | 6/2012 | Thomeczek | B66C 1/66 294/215 |
| 2003/0024458 A1 * | 2/2003 | Murphy | B63B 21/60 114/249 |
| 2003/0155177 A1 | 8/2003 | Petzl et al. | |
| 2009/0208274 A1 * | 8/2009 | Liang | F16G 15/08 403/164 |
| 2009/0265901 A1 * | 10/2009 | Berney | F16B 45/00 24/591.1 |
| 2012/0036683 A1 * | 2/2012 | Thoi | F16G 11/00 24/122.6 |
| 2012/0280523 A1 * | 11/2012 | Costa | B66D 1/00 294/82.11 |
| 2015/0143674 A1 * | 5/2015 | Maurice | F16B 45/04 24/598.7 |
| 2015/0300399 A1 * | 10/2015 | Ivanic | B60P 7/0807 411/192 |
| 2015/0367148 A1 * | 12/2015 | Caude | A62B 1/18 24/115 A |
| 2016/0319905 A1 * | 11/2016 | Cowell | F16G 15/08 |
| 2017/0211661 A1 * | 7/2017 | Kutsen | F16G 15/08 |
| 2018/0029847 A1 * | 2/2018 | Cowell | B66C 1/66 |

* cited by examiner

BELAYING LANYARD EQUIPPED WITH IMPROVED SWIVEL CONNECTION

BACKGROUND OF THE INVENTION

The invention relates to a lanyard having at least one strap or rope connected with a swivel which comprises first and second assembly parts able to rotate with respect to one another with a relative rotational movement, the two assembly parts of tubular shape being able to be engaged coaxially in one another, the first outer part being of larger diameter than that of the second inner part.

STATE OF THE ART

Existing swivel connections use a pin or a rivet to secure the two parts in rotation with respect to one another. Such prior art swivel connections are described for example in the documents EP 2878855, U.S. Pat. Nos. 1,537,785, and 2,438,548. The use of this type of swivel connection for a via ferrata lanyard is of course possible, but to the detriment of the weight and manufacturing cost of the whole of the lanyard.

OBJECT OF THE INVENTION

The object of the invention consists in providing a safety and securing lanyard equipped with a resilient swivel connection that is simple to assemble and ultra lightweight.

The lanyard according to the invention is characterized in that:
- at least one of the parts is provided with a slot or hole for fitting securing means formed by at least one flexible link made from textile material, designed to secure the two parts in rotation in the engaged state,
- the second part passes with clearance through a first aperture of the first part and comprises a rim coming into engagement in the engaged state against an axial stop of the first part, and
- the first part of the swivel connection comprises a second aperture through which the second part passes in the engaged state.

According to a preferred embodiment, the stop is arranged on an annular edge radially salient towards the inside of the first part. The tensile strength between the two parts of the swivel connection is ensured by the rim coming into engagement against the stop of the edge.

In the case of a double lanyard, each end of the two belaying straps passes through the corresponding slot of the swivel connection forming a loop sewn onto itself to form said securing means of the second part.

The straps of the lanyard can naturally be replaced by cords. They act as stops so that the two assembly parts cannot come detached from one another. Assembly of the lanyard is simple, as the two parts of the swivel connection simply have to be slid into one another and the ends of the straps or cords be sewn.

Preferentially, the two assembly parts are made from metallic material and a washer is inserted between the two parts in contact to limit the friction effect when the rotational movement of the swivel connection takes place.

The invention applies to any type of lanyard for via ferrata, caving, work at heights and mountaineering.

BRIEF DESCRIPTION OF THE DRAWINGS

Other advantages and features will become more clearly apparent from the following description of an embodiment of the invention given for non-restrictive example purposes only and represented in the appended drawings, in which.

DETAILED DESCRIPTION OF VARIOUS EMBODIMENTS

Figure 1:
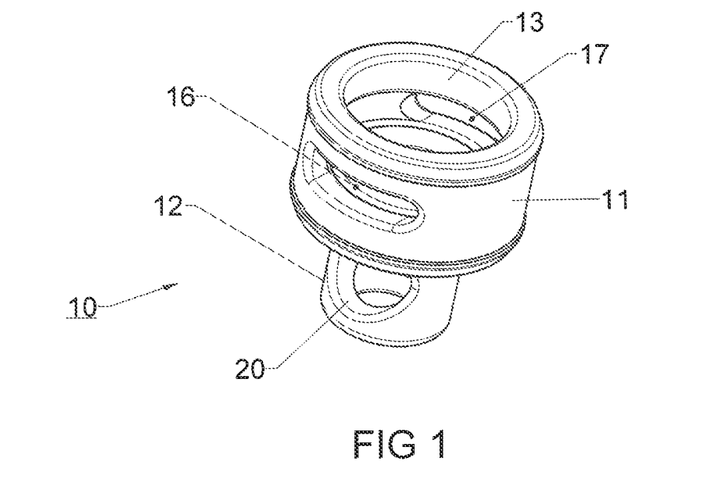
FIG. 1 is a perspective view of the first outer part of the swivel connector.
Figure 2A:
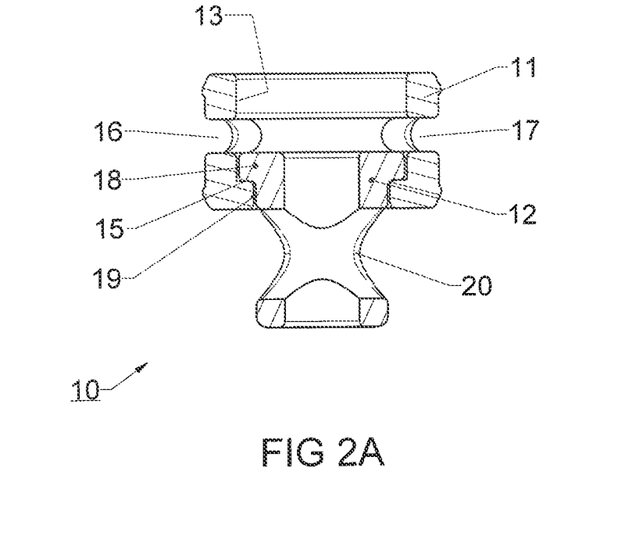
FIG. 2A shows a cross-sectional view of the second part of the swivel connector.
Figure 2B:
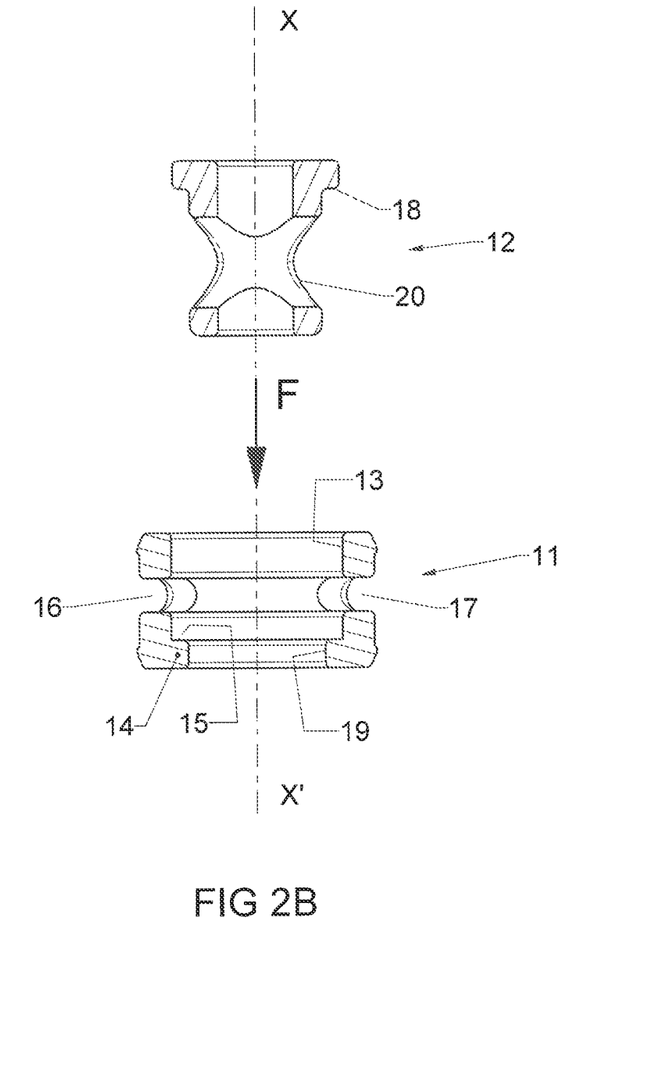
FIG. 2B is a cross-sectional view of the two parts of the swivel connector before assembly.
Figure 3:
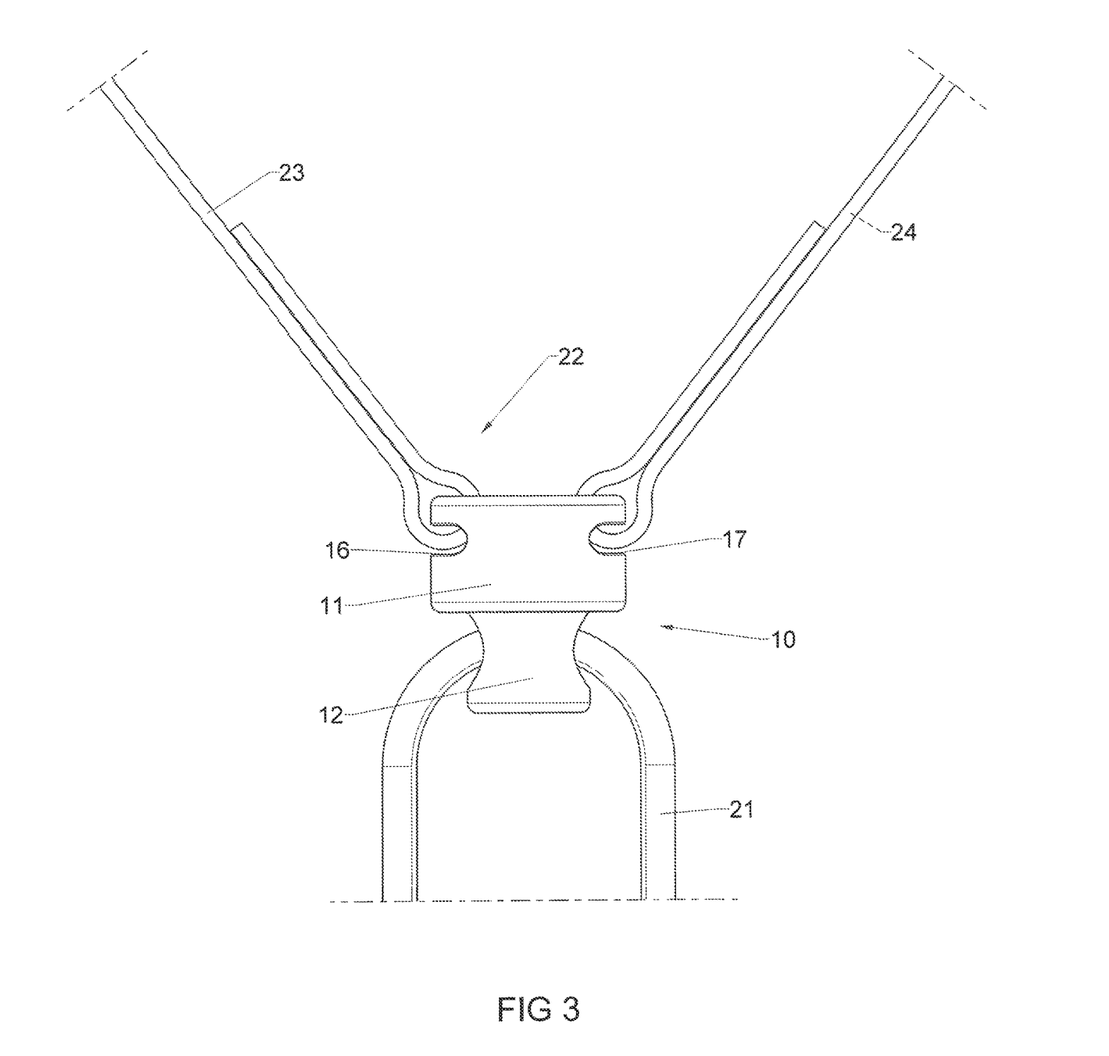
FIG. 3 represents an elevational view of a double lanyard equipped with the swivel connector of FIG. 2B after assembly.

With reference to FIGS. 1, 2A and 2B, a swivel connection, designated by the general reference numeral 10, is composed of two assembly parts 11, 12 able to be coaxially engaged in one another and designed after assembly to rotate with a relative movement around the longitudinal axis XX'. The two parts 11, 12 are preferably made from metallic material.

The first outer part 11 presents a tubular shape having at the top end a first circular receiving aperture 13 via which the second part 12 is engaged in the direction of the arrow F (FIG. 2B). The bottom end of the first part 11 comprises a second pass-through aperture 19 delineated by an annular rim 14 salient towards the inside. The presence of this rim 14 constitutes an axial stop 15 of the second part 12 at the end of assembly travel.

The cylindrical lateral surface of the first part 11 further comprises two diametrically opposite semi-circular slots 16, 17 situated at the same level between the two ends of the first part 11.

The second inner part 12 is provided with a radial and annular rim 18 having a diameter which is both smaller than the internal diameter of the first aperture 13 and larger than that of the second aperture 19 of the first part 11. The rest of the body of the second part 12 presents a smaller diameter than that of the second aperture 19 to enable longitudinal passage through the first part 11 until the rim 18 comes into engagement against the stop 15 (FIG. 2A). In this position, the top part of the second part 12 remains housed inside the first part 11 and the bottom part passes completely through the first part 11 being salient from the second aperture 19. This salient bottom part of the second part 12 is provided with a transverse hole 20 which is accessible in the assembled position to enable an attachment part 21 to be fitted, for example a karabiner or other connector (FIGS. 4 and 5).

To ensure that the two parts 11, 12 remain secured in one another in the engaged state allowing their relative rotational movement, securing means 22 are engaged in the slots 16, 17 of the first part 11 to prevent any upward axial escape of the second part 12. These securing means 22 can be formed by a flexible or elastic link made from textile material, for example straps or cords, or by a rigid metal link, for example a karabiner.

Figure 4:
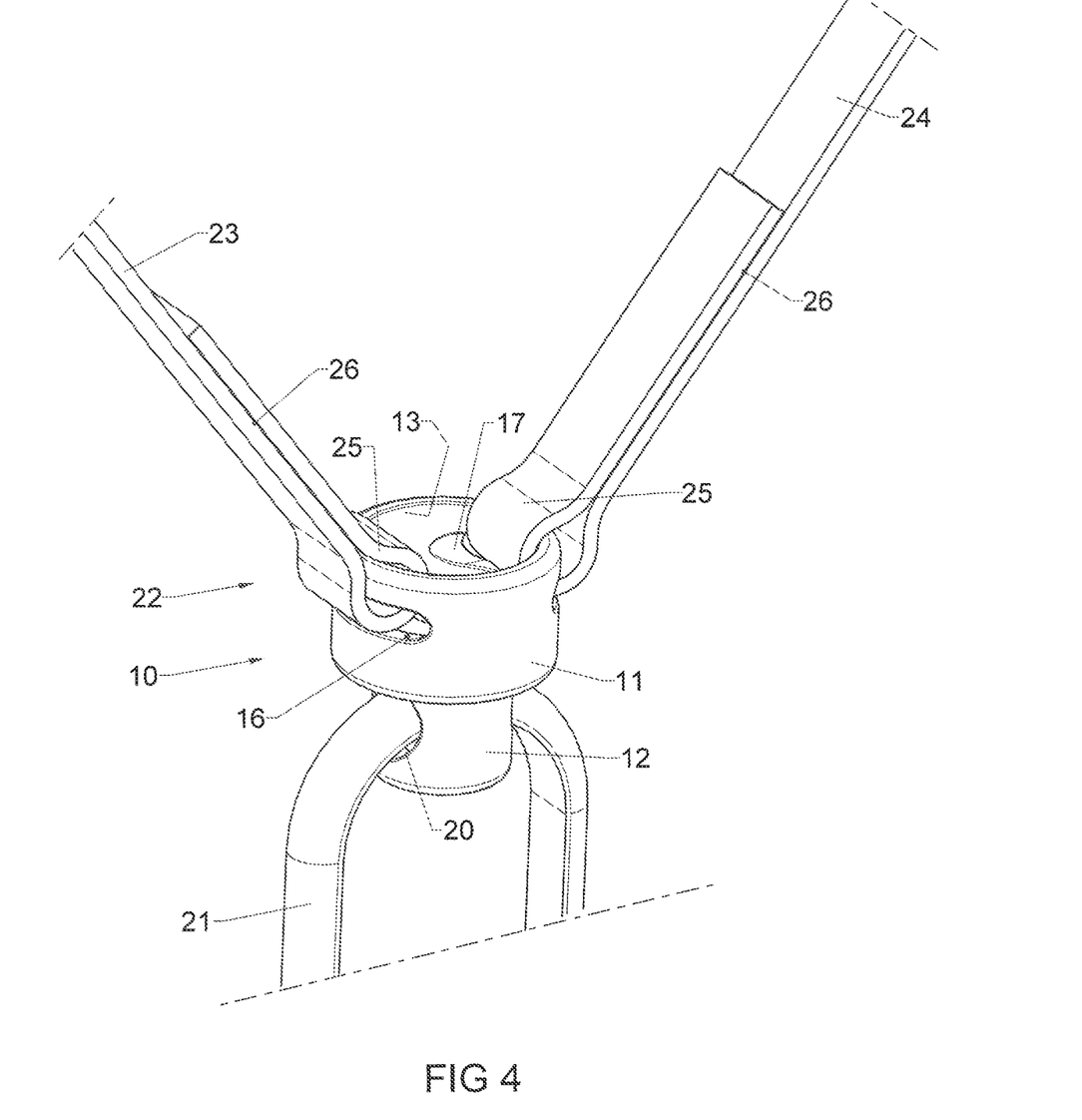
FIG. 4 illustrates a perspective view of the double lanyard with the swivel connector connected by an attachment part to the user's harness.
Figure 5:
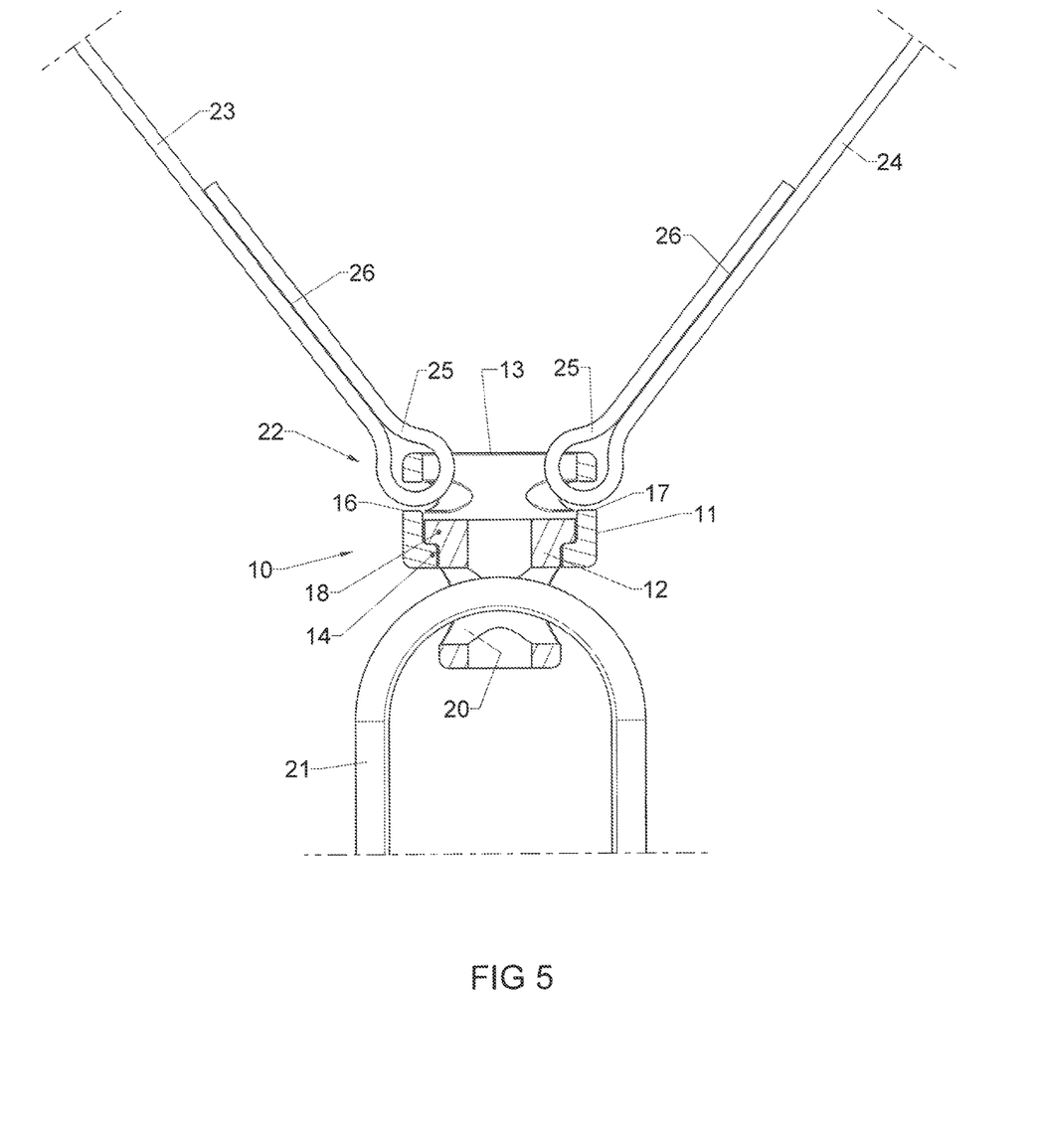
FIG. 5 is a cross-sectional view of the lanyard according to FIG. 4, FIGS. 6 and 7 illustrate cross-sectional views of two alternative embodiments of FIG. 5.

In the exemplary embodiment of FIGS. 4 and 5, the swivel connection 10 according to the invention is used to equip a double lanyard having two belaying straps 23, 24 (partially shown). The attachment part 21 of the swivel connection 10 is connected to the user's harness (not shown). Each end of the straps 23, 24 passes through the corresponding slot 16, 17 surrounding it to form a closed loop 25 which is then sewn onto itself by means of a seam 26. The presence of the two loops 25 inside the first part 11 constitutes the securing means 22 of the second part 12. The latter can then rotate in the engaged state but remains captive inside the first part 11.

The assembly of such a double lanyard with the swivel connection 10 of FIGS. 4 and 5 is simplified :

The second part 12 simply has to be engaged in the first part 11, and the two ends of the straps 23, 24 then be sewn after they have passed through the slots 16, 17. The tensile strength between the two parts 11, 12 of the swivel connection 10 is ensured by engagement of the rim 18 against the stop 15 of the edge 14.

According to an alternative embodiment (not represented), a washer can be inserted between the two parts 11, 12 in contact to limit the friction effect when rotational movement takes place.

According to another example, the second part 12 is configured to be able to be inserted or removed only in a predefined angular position with respect to the first part 11.

Figure 8:
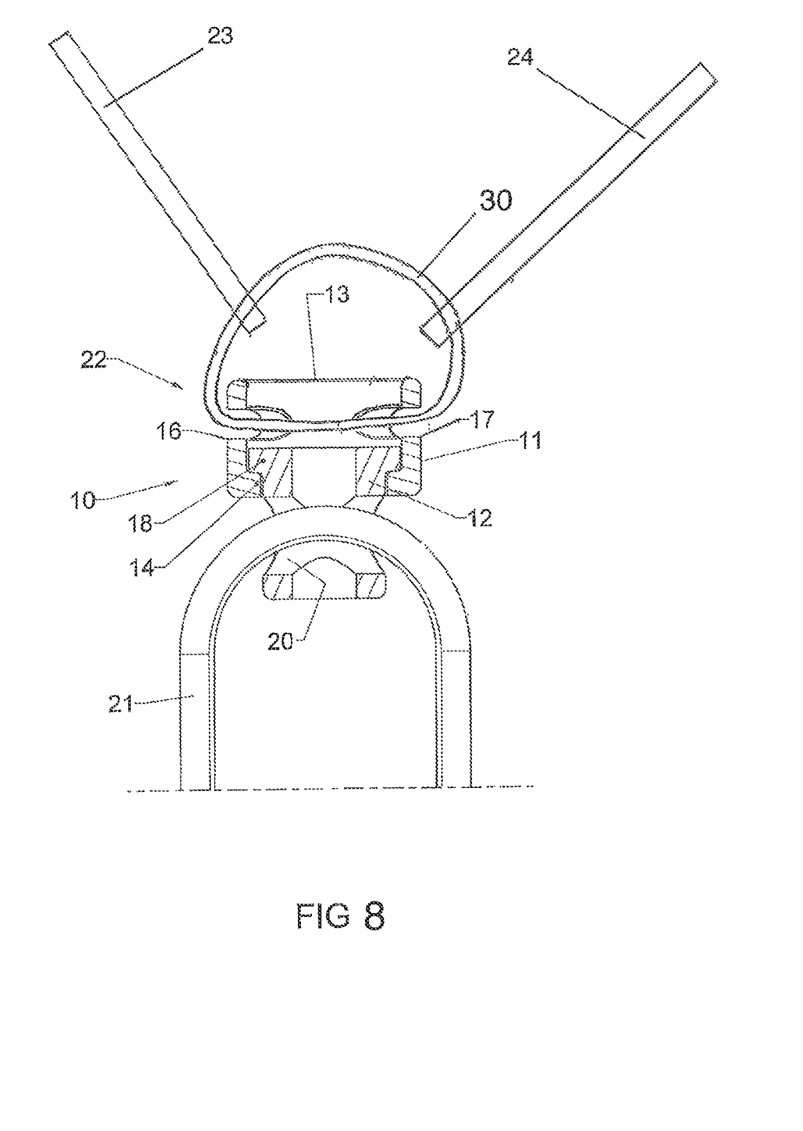
FIG. 8 illustrates a cross-sectional view of another alternative embodiment of FIG. 5.

Any other type of lanyard, with one or more belaying straps, can be associated with the swivel connection 10 according to the invention. The sewn loops of the straps 23, 24 forming the securing means 22 of FIGS. 4 and 5 can be replaced by a simple textile ring 30 of FIG. 8 passing through the slots 16, 17. The ring then acts as stop and securing means of the strap or straps.

Figure 6:
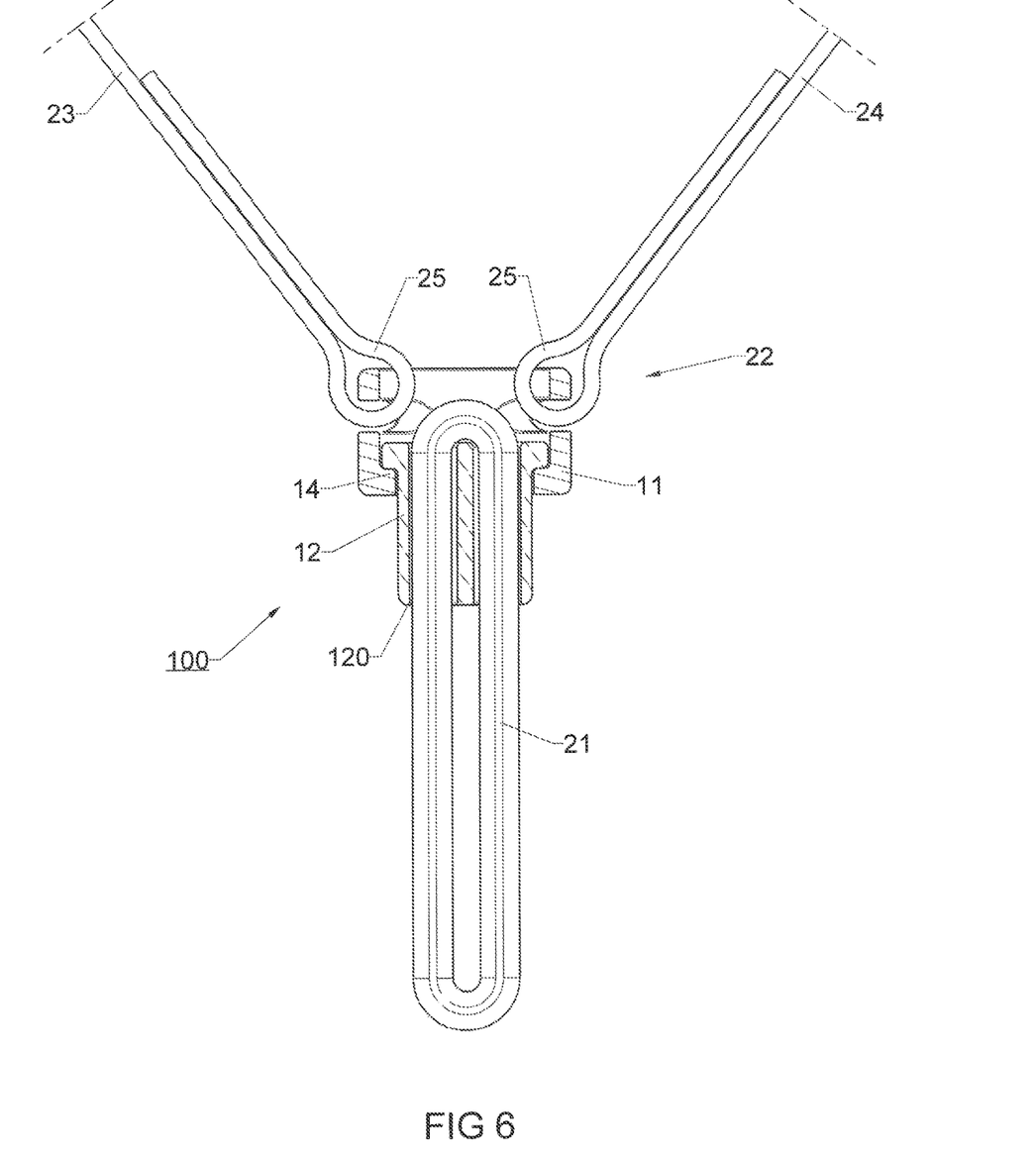

According to the variant of FIG. 6, the swivel connection 100 is similar to that of FIG. 5, with the sewn loops 25 of the straps 23, 24 of the double lanyard which act as securing means of the two parts of the swivel connection. The attachment part 21 is formed by a textile ring of flattened shape passing through an axial hole 121 of the second part 12.

Figure 7:
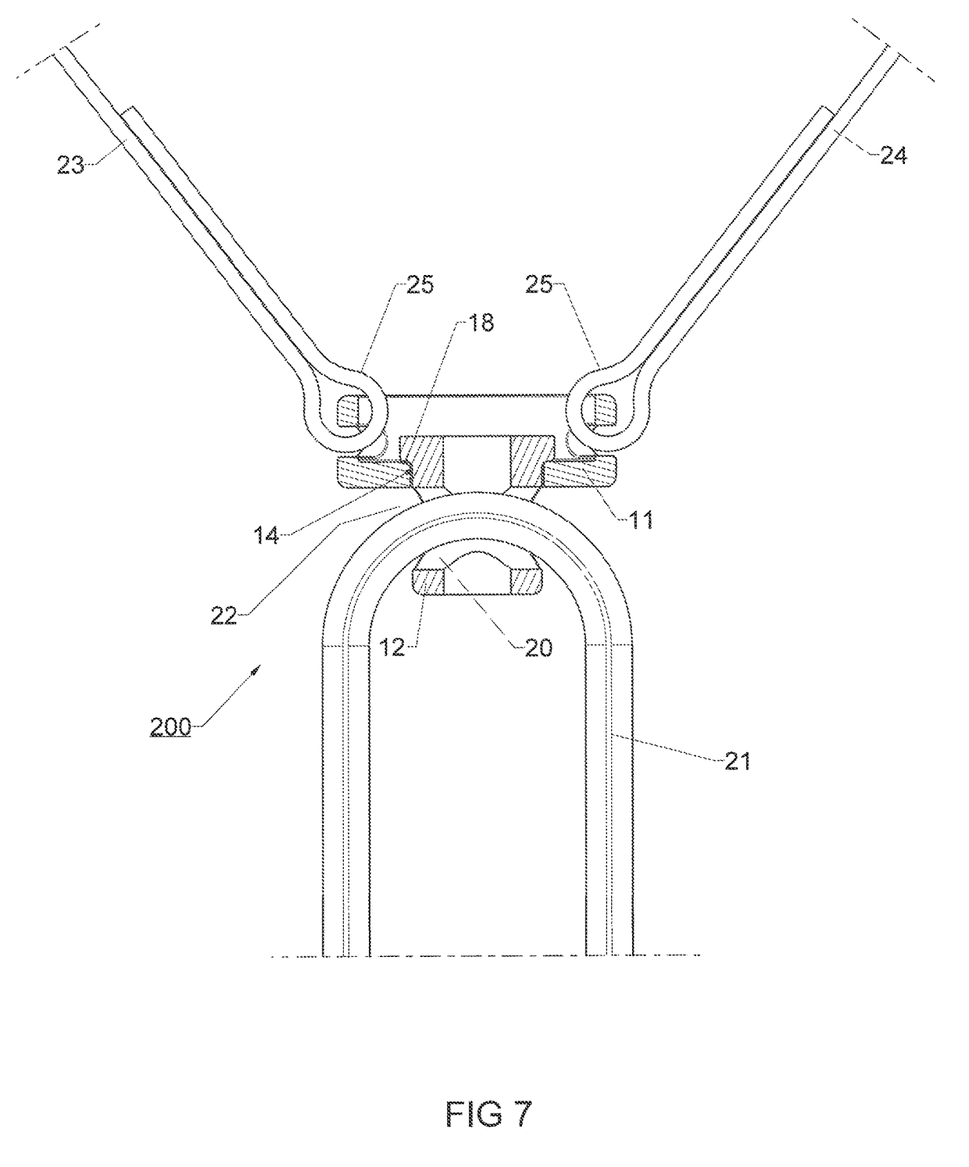

In the variant of FIG. 7, the securing means 22 of the swivel connection 200 are formed by the strap ring of the attachment part 21 which passes through a transverse hole 20 of the second part 12. The rim 18 of the latter remains pressing on the edge 14 of the first part 11.

The invention claimed is:

1. An assembly comprising:
   a swivel connection; and
   two straps or ropes connected with the swivel connection, wherein:
   the swivel connection comprises first and second assembly parts able to rotate with respect to one another with a relative rotational movement, the first and second assembly parts being able to be engaged coaxially in one another, and the first assembly part being of larger diameter than that of the second assembly part,
   the first assembly part is provided with two slots or holes for fitting the two straps or ropes,
   the second assembly part passes with clearance through a first aperture of the first assembly part and comprises a rim coming into engagement in the engaged state against an axial stop of the first assembly part,
   the first assembly part of the swivel connection comprises a second aperture through which the second assembly part passes in the engaged state, and
   the two straps or ropes have respectively two ends passing through respectively the two slots or holes to form two loops, each loop is sewn onto itself, and the two loops are located inside the first assembly part in order to secure the first and second assembly parts in rotation in the engaged state and to prevent any axial escape of the second assembly part.

2. The assembly according to claim 1, wherein the axial stop is arranged on an annular edge radiantly salient towards the inside of the first assembly part, the tensile strength between the first and second assembly parts of the swivel connection being ensured by the rim coming into engagement against the axial stop of the edge.

3. The assembly according to claim 1, further comprising a strap ring of an attachment part, which passes through a transverse hole of the second assembly part.

4. The assembly according to claim 1, wherein the first and second assembly parts are made from metallic material.

* * * * *